(12) United States Patent
Wei et al.

(10) Patent No.: US 9,723,896 B2
(45) Date of Patent: Aug. 8, 2017

(54) DIGITAL MECHANICAL MEASUREMENT LAST AND SIGNAL ACQUISITION AND ANALYSIS METHOD THEREOF

(71) Applicant: QIAODAN SPORTS CO., LTD., Quanzhou, Fujian (CN)

(72) Inventors: Shutao Wei, Fujian (CN); Dongbin Zhang, Fujian (CN); Chenbin Xie, Fujian (CN); Huilian Dai, Fujian (CN); Bin Gao, Fujian (CN); Deping Li, Fujian (CN); Haibing Gong, Fujian (CN)

(73) Assignee: QIAODAN SPORTS CO., LTD., Hu Li Xiamen, Fujian (CN)

( * ) Notice: Subject to any disclaimer, the term of this patent is extended or adjusted under 35 U.S.C. 154(b) by 0 days.

(21) Appl. No.: 14/425,014

(22) PCT Filed: Dec. 6, 2013

(86) PCT No.: PCT/CN2013/088778
§ 371 (c)(1),
(2) Date: Feb. 28, 2015

(87) PCT Pub. No.: WO2015/058440
PCT Pub. Date: Apr. 30, 2015

(65) Prior Publication Data
US 2016/0242509 A1 Aug. 25, 2016

(30) Foreign Application Priority Data

Oct. 24, 2013 (CN) .......................... 2013 1 0504110

(51) Int. Cl.
*A43D 1/04* (2006.01)
*A43D 3/02* (2006.01)
(Continued)

(52) U.S. Cl.
CPC ................. *A43D 1/04* (2013.01); *A43D 3/02* (2013.01); *A43D 3/024* (2013.01); *G01L 1/22* (2013.01); *G01L 5/16* (2013.01); *G01M 99/00* (2013.01)

(58) Field of Classification Search
CPC . A43D 1/04; A43D 3/02; A43D 3/024; G01L 1/22
See application file for complete search history.

(56) References Cited

U.S. PATENT DOCUMENTS 5,339,252 A * 8/1994 White .................... A43D 1/025
12/146 L
6,192,593 B1 * 2/2001 Borchers .................. A43D 1/02
324/716
(Continued)

*Primary Examiner* — Ryan Walsh
(74) *Attorney, Agent, or Firm* — Global IP Services; Tianhua Gu

(57) ABSTRACT

A digital mechanical measurement last comprises a three-dimensional tension-compression sensor, the center of the three-dimensional tension-compression sensor coincides with the mass center of the last, the long axis of the three-dimensional tension-compression sensor is parallel to the long axis of the last, two ends of the three-dimensional tension-compression sensor are connected to the front part and the rear part of the last, and circumference of the three-dimensional tension-compression sensor is not in contact with the last. The last helps a model designer to check and analyze problems existing in shoe models and materials, so as to improve timeliness and accuracy of model modification, save manpower, material resources and research and development time, and make shoe products fitter and more comfortable.

3 Claims, 2 Drawing Sheets

(51) Int. Cl.
*G01L 1/22* (2006.01)
*G01M 99/00* (2011.01)
*G01L 5/16* (2006.01)

(56) References Cited

U.S. PATENT DOCUMENTS

| | | | | |
|---|---|---|---|---|
| 7,343,691 | B2* | 3/2008 | Long | A43D 1/06 |
| | | | | 33/3 R |
| 7,446,884 | B2* | 11/2008 | Massen | G01B 11/24 |
| | | | | 250/334 |
| 8,763,261 | B1* | 7/2014 | Kemist | G06Q 30/06 |
| | | | | 33/3 R |
| 2004/0168329 | A1* | 9/2004 | Ishimaru | A43D 1/025 |
| | | | | 33/3 R |
| 2006/0155417 | A1* | 7/2006 | Cremaschi | A43D 1/04 |
| | | | | 700/182 |
| 2010/0293076 | A1* | 11/2010 | End | G06Q 30/06 |
| | | | | 705/26.7 |
| 2011/0277250 | A1* | 11/2011 | Langvin | A43B 3/0084 |
| | | | | 12/133 R |
| 2012/0316827 | A1* | 12/2012 | Wilkinson | A41H 1/00 |
| | | | | 702/150 |

* cited by examiner

DIGITAL MECHANICAL MEASUREMENT LAST AND SIGNAL ACQUISITION AND ANALYSIS METHOD THEREOF

CROSS REFERENCE TO RELATED PATENT APPLICATION

The present application is the U.S. national stage of PCT/CN2013/088778 filed on Dec. 6, 2013, which claims the priority of the Chinese patent applications No. 201310504110.7 filed on Oct. 24, 2013, which applications are incorporated herein by reference.

BACKGROUND OF THE PRESENT INVENTION

Field of Invention

The present invention relates to measurement instruments in the field of shoe-making industry, and specifically to a last that can measure magnitudes and distribution of forces from various parts of a shoe upper surface in a shoe-making process.

Description of Related Arts

In a shoe-making process, the last plays a very important role. The shape of the last represents the shape of a human foot, and determines the shoe style and model. In a shoe design and sample-making process, a model designer designs contours of shoes, and the shape and size of each splice material; and uses the last to make a prototype, adjust the prototype, and carry out a trial-production. During the trial-production, due to the material, model and the like, the shoe does not fit with the last, and forces in various parts of the upper are not uniform; consequently, the upper surface is folded and twisted, and two ends of the shoe are upturned after the shoe is shaped and removed from the last. In this case, the model designer needs to re-adjust the model of the upper; however, because no specific data is available to locate problems and explain causes of the problems, the model designer can only rely on personal experience, judgment and continuous trial-productions to adjust and improve the model. The subjectivity of judgment and differences in personal experience make standardized operations impossible. Continuous trial-productions not only waste a lot of materials but also result in a waste of trial-production working hours and research and development time.

Currently, during manufacturing of shoes, there are no instruments capable of measuring three-dimensional forces applied to an internal last by a shoe upper surface after lasting of a shoe, and determining whether a problem exists in the material or model of the shoe by obtaining distribution of the three-dimensional forces on the internal last of the shoes so as to help the model designer modify the model and adjust the material more quickly and accurately.

In view of the foregoing existing problems, an objective of the present invention is to provide a digital mechanical measurement last which is capable of measuring three-dimensional forces applied to an internal last by a shoe upper surface after lasting of a shoe to analyze problems existing in the model and material of the shoe upper surface and locate the problems, so as to help a model designer to modify a paper pattern and adjust the material more quickly and accurately.

SUMMARY OF THE PRESENT INVENTION

In order to achieve the above objective, the present invention uses the following technical solution:

A digital mechanical measurement last comprises a front part of the last, a rear part of the last, a three-dimensional strain gauge load cell, a signal amplifier, a data acquisition card, data acquisition system software, and a data line.

The front part and the rear part of the last are obtained by dividing the last along a vertical plane passing through the mass center of the last and perpendicular to the long axis of the last, the front part and the rear part of the last are each provided with a position for placing the three-dimensional strain gauge load cell, the depth of the position being half of the length of the three-dimensional strain gauge load cell, and a strain slit is left between the front part and the rear part of the last.

The center of the three-dimensional strain gauge load cell coincides with the mass center of the last, the long axis of the three-dimensional strain gauge load cell is parallel to the long axis of the last, two ends of the three-dimensional strain gauge load cell are connected to the front part and the rear part of the last, and circumference of the three-dimensional strain gauge load cell is not in contact with the last.

The signal amplifier, the data acquisition card, and the data acquisition system software are disposed outside the last; the signal amplifier comprises a signal input circuit, a signal amplification circuit, a signal filtering circuit, and a signal output circuit, and transmits a signal to the data acquisition card through the signal output circuit; the data acquisition card comprises a data acquisition module, an A/D conversion module, and a host computer communication module, and completes communication with a computer through a USB interface; and the data line passes through a data line channel in the rear part of the last, and connects the three-dimensional strain gauge load cell, the signal amplifier, the data acquisition card, and a data acquisition system, to implement data measurement.

According to a signal acquisition and analysis method of the digital mechanical measurement last, after being physically tensioned and compressed, the three-dimensional strain gauge load cell outputs proportional positive and negative voltage signals according to force magnitudes and directions; the signal amplifier amplifies and filters the voltage signals; the data acquisition card acquires the signals processed by the signal amplifier, and completes communication with a computer through a USB interface; data analysis software comprising a user instruction processing module, a module communicating with the acquisition card, a data processing module, a data display module, and a data recording module is installed in the computer; the user instruction processing module receives an operation command of a user, and transmits messages to corresponding modules according to different commands; the module communicating with the acquisition card completes communication with the acquisition card, sends an operation command to the acquisition card, and reads data from the acquisition card; the data processing module receives data from the module communicating with the acquisition card, and filters and performs computation on the data; the data display module simulates and displays three-dimensional forces according to data, and displays a three-dimensional force vector diagram using the center of the three-dimensional strain gauge load cell as a start point; the data recording module records test results in real time, and records measurement results; and the data analysis software provides a data export interface to be used by third-party software, and the data analysis software provides a data import interface capable of analyzing data acquired by a third-party instrument or importing and analyzing data that has been acquired.

DETAILED DESCRIPTION OF THE PREFERRED EMBODIMENTS

The present invention is further described below with reference to the accompanying drawings.

Figure 1:
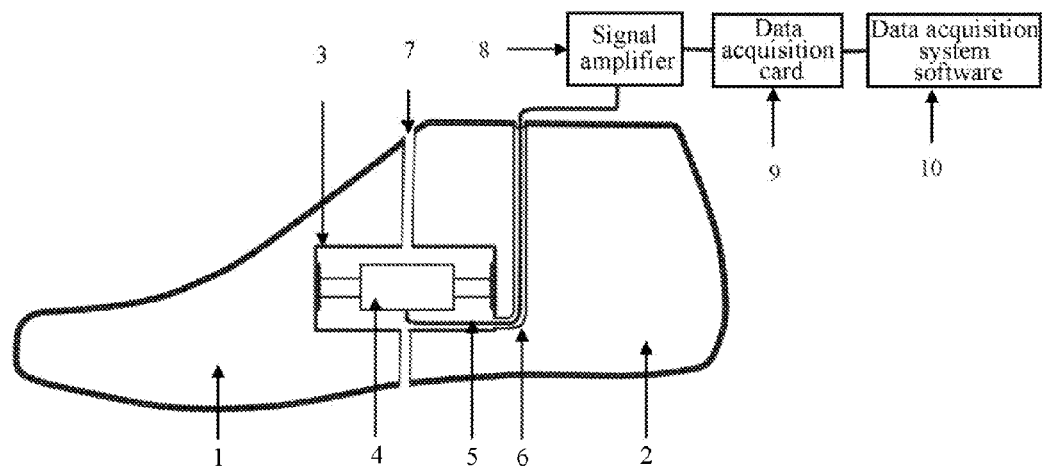
FIG. 1 is a schematic sectional view of a digital mechanical measurement last.

List of Reference Numerals
1—front part of the last
2—rear part of the last
3—internal cavity of the digital mechanical measurement last
4—three-dimensional strain gauge load cell
5—data line
6—data line channel
7—strain slit
8—signal amplifier
9—data acquisition card
10—data acquisition system software As shown in FIG. 1, the digital mechanical measurement last comprises a front part 1 of last, a rear part 2 of the last, a three-dimensional strain gauge load cell 4, a signal amplifier 8, a data acquisition card 9, data acquisition system software 10, and a data line 5. The front part 1 of the last and the rear part 2 of the last are combined to function as a conventional last, namely, have a function of supporting an upper; the three-dimensional strain gauge load cell 4 is used to measure three-dimensional forces applied to the internal last by the upper; with the signal amplifier 8, the data acquisition card 9, and the data line 5 that are connected to a computer, the data acquisition system software 10 acquires and stores data of the three-dimensional strain gauge load cell, and displays, analyzes and exports the acquired data in real time.

The front part 1 of the last and the rear part 2 of the last are obtained by dividing the last along a vertical plane passing through the mass center of the last and perpendicular to the long axis of the last; the front part and the rear part of the last are each provided with a position for placing the three-dimensional strain gauge load cell 4, the depth of the position being half of the length of the three-dimensional strain gauge load cell, and a strain slit 7 is left between the front part 1 of the last and the rear part 2 of the last.

One end of the three-dimensional strain gauge load cell 4 is fixed to a cavity of the front part 1 of the last, the other end is located in a cavity of the rear part 2 of the last; the front part and the rear part of the last are connected to form a whole by using the three-dimensional strain gauge load cell 4, and circumference of the three-dimensional strain gauge load cell 4 is not in contact with the last; the center of the three-dimensional strain gauge load cell 4 coincides with the mass center of the last, and the long axis of the three-dimensional strain gauge load cell 4 is parallel to the long axis of the last.

The data line 5 is connected to the signal amplifier 8 through a data line channel 6 in the rear part 2 of the last, which does not affect the supporting function of the conventional last while implementing data measurement of the present invention.

Figure 2:
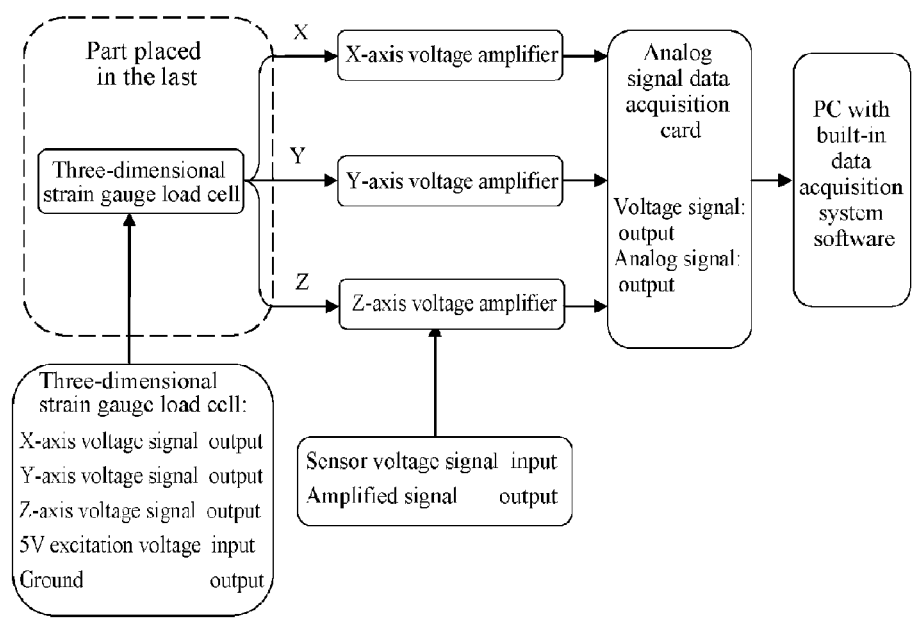
FIG. 2 is a diagram of a working principle of a digital mechanical measurement last.

After a shoe upper surface is sleeved over the digital mechanical measurement last, forces applied on the last by the shoe upper surface are transferred to the three-dimensional strain gauge load cell 4 through the front part 1 of the last and the rear part 2 of the last; the three-dimensional strain gauge load cell 4 is strained, which causes a change in a resistance value, thereby generating a voltage change. The voltage change is processed by the signal amplifier 8. The data acquisition card 9 acquires signals processed by the signal amplifier, data in the signals is transmitted, over the data line 5 and through a USB interface, to the PC in which the data acquisition system software 10 is installed, and the data acquisition system software 10 records, displays, processes, and analyzes the signals. The working principle of the digital mechanical measurement last is shown in FIG. 2.

Figure 3:
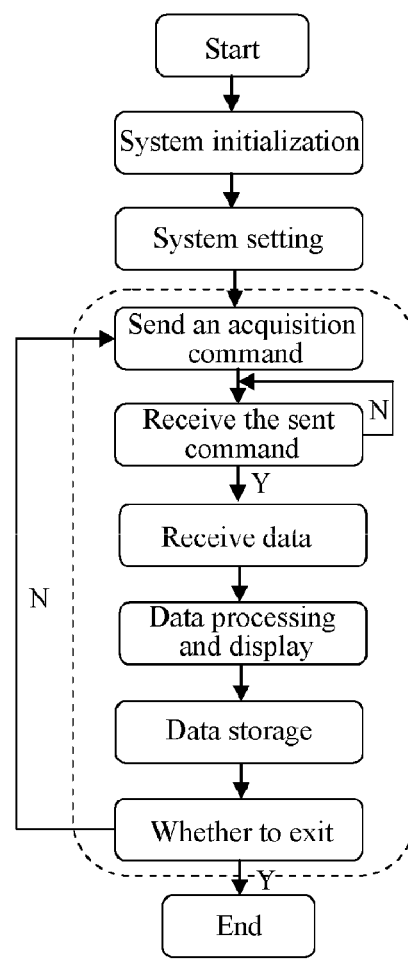
FIG. 3 is a schematic diagram of a workflow of data acquisition system software of the digital last.

The data acquisition system software 10 comprises a user instruction processing module, a module communicating with the acquisition card, a data processing module, a data display module, and a data recording module, and the workflow of the data acquisition system software of the digital last is shown in FIG. 3:

the user instruction processing module receives an operation command of a user, and transmits messages to corresponding modules according to different commands;

the module communicating with the acquisition card completes communication with the acquisition card, sends an operation command to the acquisition card, and reads data from the acquisition card;

the data processing module receives data from the module communicating with the acquisition card, and filters and performs computation on the data;

the data display module simulates and displays three-dimensional forces according to data, and displays a three-dimensional force vector diagram using the center of the three-dimensional strain gauge load cell as a start point in a three-dimensional space;

the data recording module: real-time records measurement results, and the magnitude and direction of a resultant force in real time; and the data analysis software provides a data export interface to be used by third-party software, and the data analysis software provides a data import interface capable of analyzing data acquired by a third-party instrument or importing and analyzing data that has been acquired.

By analyzing the magnitudes and directions of the three-dimensional forces acquired, the digital mechanical measurement last helps a model designer determine model-related problems existing in the shoe upper surface and positions of the problems quickly and accurately, which reduces the number of trial-production times, saves a lot of manpower, material resources and time, and reduces manufacturing costs of shoe products; moreover, the model is modified according to reliable data, and a standard operation mode is formed, which makes sure that the shoe products are fit and comfortable.

The present invention is not merely limited to the shape and the structure of FIG. 1, for example, the three-dimensional strain gauge load cell may have different shapes; more than one three-dimensional strain gauge load cell may be mounted on the last, and the three-dimensional strain gauge load cell may be connected to the acquisition card and to the last by using other methods and at other positions; the function of the data acquisition system software may also be optimized and adjusted without departing from the function scope of the present invention. The structures or functions are regarded as extensions of the present invention, and any technical solution similar to the structures or functions of the present invention falls within the protection scope of the present invention.

What is claimed is:

1. A digital mechanical measurement last system comprising: a front part of the last, a rear part of the last, a three-dimensional strain gauge load cell, a signal amplifier, a data acquisition card, data acquisition system software, and a data line, wherein the front part and the rear part of the last are obtained by dividing the last along a vertical plane passing through a mass center of the last and perpendicular to the long axis of the last, the front part and the rear part of the last are each provided with a position for placing the three-dimensional strain gauge load cell, the depth of the position is half of a length of the three-dimensional strain gauge load cell, and a strain slit is existed between the front part and the rear part of the last;

a center of the three-dimensional strain gauge load cell coincides with the mass center of the last, a long axis of the three-dimensional strain gauge load cell is parallel to a long axis of the last, two ends of the three-dimensional strain gauge load cell are connected to the front part and the rear part of the last, and a circumference of the three-dimensional strain gauge load cell is not in contact with the last; and the signal amplifier, the data acquisition card, and the data acquisition system software are disposed outside the last, the signal amplifier comprises a signal input circuit, a signal amplification circuit, a signal filtering circuit, and a signal output circuit, and transmits a signal to the data acquisition card through the signal output circuit; the data acquisition card comprises a data acquisition module, an A/D conversion module, and a host computer communication module, and completes communication with a computer through a USB interface; and the data line passes through a data line channel in the rear part of the last, and connects the three-dimensional strain gauge load cell, the signal amplifier, the data acquisition card, and a data acquisition system, to implement data measurement.

2. The digital mechanical measurement last system as in claim 1, wherein, the data acquisition system software comprising:

an user instruction processing module, which receives an operation command of a user, and transmits messages to corresponding modules according to different commands;

a module communicating with the acquisition card completes communication with the acquisition card, which sends an operation command to the acquisition card, and reads data from the acquisition card;

a data processing module, which receives data from the module communicating with the acquisition card, and filters and performs computation on the data;

a data display module, which simulates and displays three-dimensional forces according to data, and displays a three-dimensional force vector diagram using the center of the three-dimensional strain gauge load cell as a start point in a three-dimensional space;

a data recording module, which records measurement results in real time.

3. The digital mechanical measurement last system as in claim 2, wherein the data acquisition system software provides a data import interface capable of analyzing data acquired by a third-party instrument or importing and analyzing data that has been acquired.

* * * * *